United States Patent
Hong et al.

(10) Patent No.: US 12,454,709 B2
(45) Date of Patent: Oct. 28, 2025

(54) RECOMBINANT VECTOR FOR TRANSFORMATION IMPROVING GLUTAMINE PRODUCTIVITY, AND STRAIN EMPLOYING SAME

(71) Applicant: DAESANG CORPORATION, Seoul (KR)

(72) Inventors: In Pyo Hong, Seoul (KR); Bong Ki Kim, Seoul (KR); Min Jin Choi, Gyeonggi-do (KR); Seok Hyun Park, Gyeonggi-do (KR); Jae Chun Han, Seoul (KR)

(73) Assignee: DAESANG CORPORATION, Seoul (KR)

( * ) Notice: Subject to any disclaimer, the term of this patent is extended or adjusted under 35 U.S.C. 154(b) by 381 days.

(21) Appl. No.: 17/916,331

(22) PCT Filed: Mar. 24, 2021

(86) PCT No.: PCT/KR2021/003633
§ 371 (c)(1),
(2) Date: Sep. 30, 2022

(87) PCT Pub. No.: WO2021/201489
PCT Pub. Date: Oct. 7, 2021

(65) Prior Publication Data
US 2023/0220430 A1    Jul. 13, 2023

(30) Foreign Application Priority Data
Mar. 30, 2020 (KR) .......................... 10-2020-0038628

(51) Int. Cl.
| | | |
|---|---|---|
| *C12P 13/14* | (2006.01) | |
| *C12N 1/20* | (2006.01) | |
| *C12N 9/00* | (2006.01) | |
| *C12N 15/52* | (2006.01) | |
| *C12N 15/77* | (2006.01) | |
| *C12R 1/15* | (2006.01) | |

(52) U.S. Cl.
CPC ................ *C12P 13/14* (2013.01); *C12N 1/20* (2013.01); *C12N 9/93* (2013.01); *C12N 15/52* (2013.01); *C12N 15/77* (2013.01); *C12R 2001/15* (2021.05); *C12Y 603/01002* (2013.01)

(58) Field of Classification Search
CPC .. C12P 13/14; C12N 1/20; C12N 9/93; C12N 15/52; C12R 2001/15; C07K 14/34
See application file for complete search history.

(56) References Cited

U.S. PATENT DOCUMENTS 7,439,050 B2 * 10/2008 Pompejus ............... C12P 13/24
435/106
9,115,368 B2 * 8/2015 Abad ............. C12Y 102/01024

FOREIGN PATENT DOCUMENTS

| CN | 106635946 | 5/2017 |
|---|---|---|
| EP | 1424397 | 6/2004 |
| EP | 1783203 | 5/2007 |
| JP | WO2006/001380 | 1/2006 |
| JP | 4898441 | 3/2012 |
| JP | 2017-79705 | 5/2017 |
| KR | 1992-0005975 | 4/1992 |
| KR | 10-2014-0087201 | 7/2014 |
| KR | 10-2216450 | 2/2021 |
| WO | 01/00843 A2 | 1/2001 |
| WO | 01/00843 A3 | 1/2001 |

OTHER PUBLICATIONS

International Search Report issued Jun. 25, 2021 in International (PCT) Application No. PCT/KR2021/003633.
Nolden et al., "Glutamine synthetases of *Corynebacterium glutamicum*: transcriptional control and regulation of activity", FEMS Microbiology Letters, vol. 201, 2001, pp. 91-98.
Extended European Search Report issued Mar. 22, 2024 in European Patent Application No. 21780977.1.
UNIPROT accession No. A0A160PS60 "Glutamine synthetase from *Corynebacterium suranareeae*", Jul. 6, 2016, XP002811164, 2 pages.
GSN accession No. AAF71801 "*Corynebacterium glutamicum* MP protein nucleotide sequence SEQ ID No. 97", Apr. 30, 2001, XP002811165, 2 pages.
Notice of Reasons for Refusal issued Aug. 14, 2023 in Japanese Application No. 2022-560115 (with English translation).
UniProtKB/TrEMBL, [online], A0A160PS60, Accession No. A0A160PS60, entry version 10, [retrieved on Aug. 4, 2023], 2019, <URL: https://rest.uniprot.org/unisave/A0A160PS60?format=txt &versions=10>.
Jakoby, Marc et al., "Isolation of the *Corynebacterium glutamicum* glnA gene encoding glutamine synthetase I", FEMS Microbiology Letters, 1997, vol. 154, No. 1, pp. 81-88.

\* cited by examiner

Primary Examiner — Sharmila G Landau
Assistant Examiner — Ashley T White
(74) Attorney, Agent, or Firm — Wenderoth, Lind & Ponack, L.L.P.

(57) ABSTRACT

The present invention relates to a strain which has increased glutamine productivity due to being transformed with a vector containing a nucleotide sequence that encodes a glutamine synthetase consisting of the amino acid sequence of SEQ ID NO: 1.

8 Claims, 5 Drawing Sheets
Specification includes a Sequence Listing.

RECOMBINANT VECTOR FOR TRANSFORMATION IMPROVING GLUTAMINE PRODUCTIVITY, AND STRAIN EMPLOYING SAME

TECHNICAL FIELD

The present invention relates to a recombinant vector for transformation that increases glutamine productivity, and a strain into which the same has been introduced.

BACKGROUND ART

The activity of glutamine synthetase (GS) is regulated by glutamine synthetase adenylyltransferase (ATase, glnE). ATase regulates the activity of GS by catalyzing adenylation and deadenylation of GS, and is affected by the nitrogen concentration in medium. The activity of ATase is regulated by PII (nitrogen regulatory protein P-II gene, glnB). FIG. 1 shows a mechanism in which the activity of GS is inhibited by the activation of PII and ATase when the nitrogen concentration is high. Thus, when a nitrogen source is supplied to produce glutamine, a problem arises in that the activity of GS is feedback-inhibited by the supplied nitrogen source, resulting in reduction in glutamine production.

Thus, in order to increase the efficiency of glutamine production, it is required to suppress the feedback inhibition of GS caused by ATase. Japanese Patent No. JP4898441 discloses a strain in which glutamine production is increased by inhibiting the activities of glnB and glnE genes involved in the inhibition of GS activity, but there is still room for improvement.

PRIOR ART DOCUMENTS (Patent Document 0001) Japanese Patent No. JP 4898441 B2 (Jan. 6, 2012)

DISCLOSURE

Technical Problem

One embodiment provides a glutamine-producing strain comprising a vector containing a nucleotide sequence encoding a glutamine synthetase (GS) consisting of the amino acid sequence of SEQ ID NO: 1.

Technical Solution

One aspect provides a vector for transformation containing a nucleotide sequence encoding a glutamine synthetase (GS) consisting of the amino acid sequence of SEQ ID NO: 1.

The glutamine synthetase is an enzyme that synthesizes glutamine from glutamate and ammonia. Since the extent to which the activity of the glutamine synthetase consisting of the amino acid sequence of SEQ ID NO: 1 is inhibited by ATase is lower than that of a glutamine synthetase consisting of another sequence is inhibited by ATase, the glutamine synthetase having the amino acid sequence of SEQ ID NO: 1 may increase glutamine productivity.

According to one embodiment, the nucleotide sequence encoding the glutamine synthetase may consist of the nucleotide sequence of SEQ ID NO: 2.

According to one embodiment, the glutamine synthetase consisting of the amino acid sequence of SEQ ID NO: 1 and the glnA gene consisting of the nucleotide sequence of SEQ ID NO: 2 may be derived from a *Corynebacterium glutamicum* strain deposited under accession number KFCC10694. According to one embodiment, as a result of comparing the homology between the glnA sequence derived from KFCC10694 and the glnA sequence derived from another *Corynebacterium glutamicum* strain ATCC13032, it was confirmed that the nucleotide sequence homology was only 88.2% and the amino acid sequence homology between glutamine synthetases expressed from the genes was only 93.7%. Due to this sequence difference, the extent to which the activity of the glutamine synthetase derived from KFCC10694 is inhibited by ATase may differ from the extent to which the activity of the glutamine synthetase consisting of the other sequence is inhibited by ATase.

According to one embodiment, the vector for transformation may contain a promoter operably linked to the nucleotide sequence encoding the glutamine synthetase. The term "operably linked" means that a gene to be expressed is functionally linked to regulatory sequence(s) therefor in a manner that allows for expression of the gene. When the expression level of GS is increased by the promoter, the feedback inhibition of GS by ATase may be suppressed, thereby increasing glutamine productivity. The promoter may be a constitutive promoter or an inducible promoter. For example, the constitutive promoter may be $P_{cspB}$, $P_{aprE}$, $P_{180}$, $P_{sod}$, $P_{dapA}$, $P_{porB}$, $P_{ilvC}$, $P_{L10}$, $P_{L26}$, $P_{I16}$, $P_{I51}$, $P_{H30}$, or $P_{H36}$, and the inducible promoter may be $P_{lacUV5}$, $P_{tac}$, $P_{trc}$, $P_{popB}$, $P_{aceA/aceB}$, $P_{gntP/gntK}$, $P_{CJ1OX2}$, $P_{tac-M}$, $P_{malE1}$, or $P_{BAD}$. According to one embodiment, the promoter may be a superoxide dismutase ($P_{sod}$) promoter. The vector for transformation may contain an expression regulatory sequence such as an enhancer.

According to one embodiment, the vector for transformation may contain a transcription terminator sequence operably linked to the nucleotide sequence encoding the glutamine synthetase. According to one embodiment, the transcription terminator sequence may be an rrnBT1T2 sequence.

The vector for transformation vector may contain, as a selection marker, an antibiotic (e.g., neomycin, carbenicillin, kanamycin, spectinomycin or hygromycin, etc.) resistance gene (e.g., neomycin phosphotransferase (nptII) or hygromycin phosphotransferase (hpt), etc.).

Examples of the vector include, but are not limited to, a plasmid vector, a cosmid vector, a bacteriophage vector, a viral vector, and the like.

Another aspect provides a strain transformed with the vector for transformation.

According to one embodiment, the transformed strain may be a strain in which the native glnA gene has been inactivated. The term "native" refers to a gene naturally possessed by the microorganism. The term "inactivation" refers to any genetic modification resulting in the impairment of transcription or translation of the gene of interest or activity of the gene product, and may include inactivation of a promoter. This gene-specific inactivation may be performed by a method established in the art. For example, the gene-specific inactivation may be performed by gene deletion, gene truncation by insertion of a heterogeneous sequence, nonsense mutation, frameshift mutation, missense mutation, or the like.

According to one embodiment, the transformed strain may be a strain in which the native glnE gene has been inactivated. When the expression of the native glnE gene is reduced or lost, the expression of ATase, which inhibits the activity of the glutamine synthetase, is reduced, and thus the glutamine productivity may be increased.

According to one embodiment, the transformed strain may be a *Corynebacterium* sp. strain, for example, a *Corynebacterium glutamicum* strain deposited under accession number KFCC10694.

The transformation may be performed using a suitable vector introduction technique selected depending on the host cell, as is known in the art. For example, vector introduction may be performed by electroporation, heat shock, calcium phosphate ($CaPO_4$) precipitation, calcium chloride ($CaCl_2$) precipitation, microinjection, polyethylene glycol (PEG) method, DEAE-dextran method, cationic liposome method, lithium acetate-DMSO method, or combinations thereof.

Still another aspect provides a method for producing glutamine comprising a step of culturing the transformed strain.

The culturing may be performed using a suitable medium and culture conditions known in the art, and any person skilled in the art may easily adjust and use the medium and the culture conditions. Specifically, the medium may be a liquid medium, without being limited thereto. Examples of the culturing method include, but are not limited to, batch culture, continuous culture, fed-batch culture, or combinations thereof.

The medium should meet the requirements of a specific strain in a proper manner, and may be appropriately modified by a person skilled in the art. For example, for the culture medium for the *Corynebacterium* sp. strain, reference may be made to a known document (Manual of Methods for General Bacteriology, American Society for Bacteriology, Washington D.C., USA, 1981). In addition, the medium may contain various carbon sources, nitrogen sources, and trace element components. Examples of carbon sources that may be used include: saccharides and carbohydrates such as glucose, sucrose, lactose, fructose, maltose, starch, and cellulose; oils and fats such as soybean oil, sunflower oil, castor oil, and coconut oil; fatty acids such as palmitic acid, stearic acid, and linoleic acid; alcohols such as glycerol and ethanol; and organic acids such as acetic acid. These substances may be used individually or as a mixture. Examples of nitrogen sources that may be used include peptone, yeast extract, meat extract, malt extract, corn steep liquor, soybean meal, urea, or inorganic compounds such as ammonium sulfate, ammonium chloride, ammonium phosphate, ammonium carbonate, and ammonium nitrate. The nitrogen sources may also be used individually or as a mixture. Examples of phosphorus sources that may be used include potassium dihydrogen phosphate or dipotassium hydrogen phosphate or the corresponding sodium-containing salts. The culture medium may contain metal salts such as magnesium sulfate or iron sulfate, which are required for growth. In addition, the culture medium may contain essential growth substances such as amino acids and vitamins. Moreover, suitable precursors may be used in the culture medium. The medium or individual components may be added to the culture medium batchwise or in a continuous manner by a suitable method during culturing.

The pH of the culture medium may be adjusted by adding compounds such as ammonium hydroxide, potassium hydroxide, ammonia, phosphoric acid and sulfuric acid to the microorganism culture medium in an appropriate manner during the culturing. In addition, during the culturing, foaming may be suppressed using an anti-foaming agent such as a fatty acid polyglycol ester. Additionally, to keep the culture medium in an aerobic condition, oxygen or an oxygen-containing gas (for example, air) may be injected into the culture medium. The temperature of the culture medium may be generally 20° C. to 45° C., for example, 25° C. to 40° C. The culturing may be continued until a desired amount of L-glutamine is produced. For example, the culturing time may be 10 hours to 160 hours.

The method for producing glutamine may comprise a step of recovering L-glutamine from the cultured microorganism or the medium. The method for recovering L-glutamine is not particularly limited, and L-glutamine may be recovered using a suitable method known in the art depending on the culture method. Examples of the method for recovering L-glutamine include centrifugation, filtration, anion exchange chromatography, crystallization, HPLC, and the like.

Advantageous Effects

Since the glutamine synthetase expressed by the strain according to one embodiment is less feedback-inhibited by ATase, it may significantly increase glutamine production.

MODE FOR INVENTION

Hereinafter, one or more embodiments will be described in more detail with reference to examples. However, these examples are for illustrating one or more embodiments, and the scope of the present invention is not limited to these examples.

Example 1

Construction of Vectors for Deletion of glnA and glnE Genes on KFCC-10694 Chromosome As materials for vector construction, Wizard genomic DNA purification kit (Promega, USA), PrimeSTAR Max DNA polymerase (Takara, Japan), DNA ligation kit (Takara, Japan), and HindIII and BamHI (NEB, England) were used.

1-1. Construction of Vector for Deletion of glnA

Using the chromosomal DNA of a KFCC-10694 strain (*Corynebacterium glutamicum* MWM-891020) as a template, PCR was performed with primer 1 and primer 2 to obtain an amplification product of the left arm of glnA of KFCC-10694. Similarly, PCR was performed with primer 3 and primer 4 to obtain an amplification product of the right arm of glnA.

Figure 1:
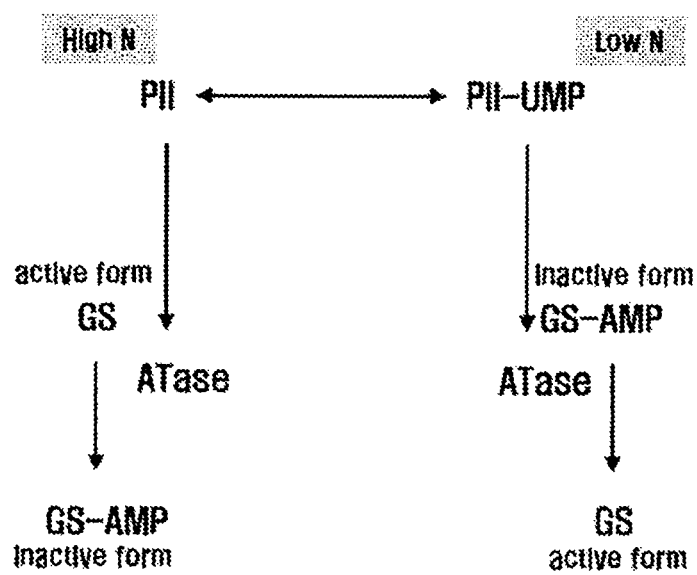
FIG. 1 shows a mechanism in which the activity of glutamine synthetase is regulated.
Figure 2:
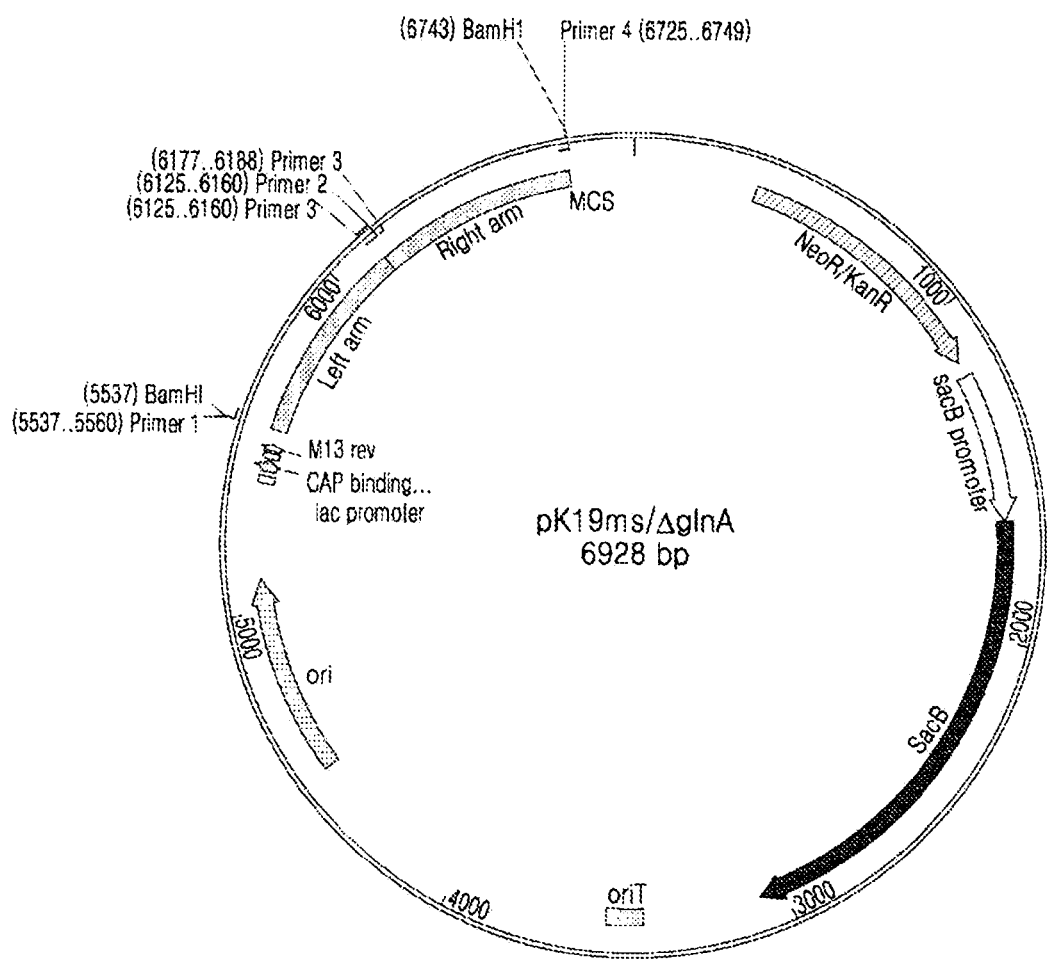
FIG. 2 shows a pk19ms/ΔglnA vector according to one embodiment.

The amplification products of the left arm and right arm of glnA were subjected to crossover PCR with a combination of primer 1 and primer 4 to obtain an amplification product in which the left arm and the right arm were ligated together. The obtained amplification product was inserted into the BamHI site of a pK19mobSacB vector. The constructed vector for deletion of glnA was named pK19 ms/ΔglnA (see FIG. 2).

1-2. Construction of Vector for Deletion of glnE

In the same manner as construction of the vector for deletion of glnA, PCR was performed with a combination of primer 5 and primer 6 to obtain an amplification product of the left arm of glnE of KFCC-10694, and PCR was performed with a combination of primer 7 and primer 8 to obtain an amplification product of the right arm of glnE.

Figure 3:
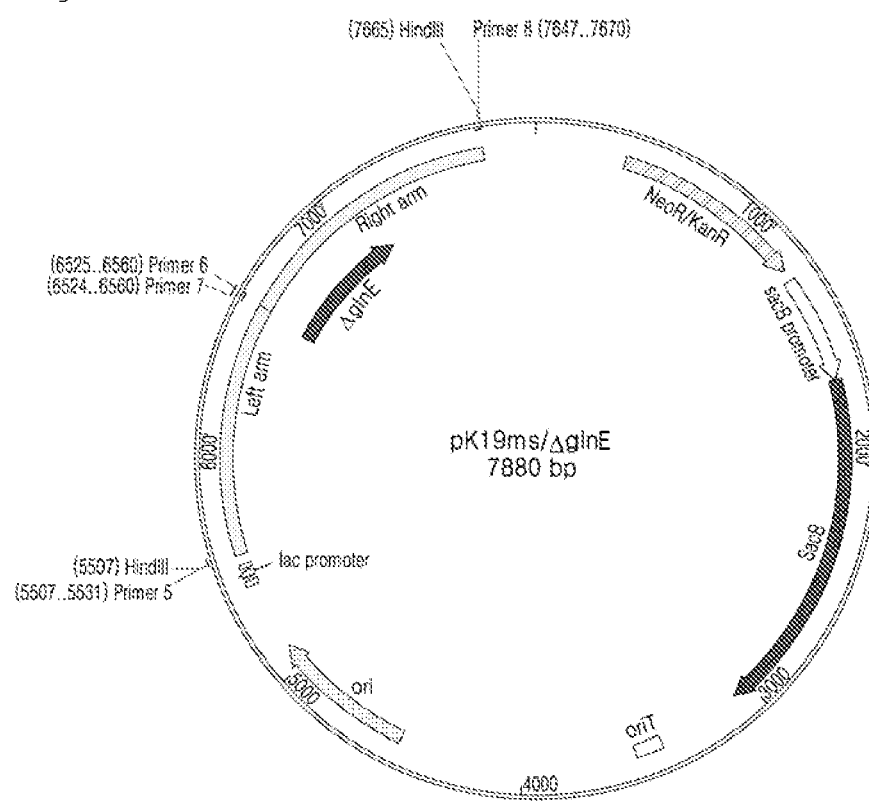
FIG. 3 shows a pk19ms/ΔglnE vector according to one embodiment.

The amplification products of the left arm and right arm of glnE were amplified by crossover PCR using a combination of primer 5 and primer 8 to obtain an amplification product in which the left arm and the right arm were ligated together. The amplification product was inserted into the HindIII site of a pK19mobSacB vector. The constructed vector for deletion of glnE was named pK19 ms/ΔglnE (see FIG. 3).

Table 1 below shows information on the glnA of KFCC-10694, the glnE of KFCC-10694, and the nucleotide sequences of primers 1 to 8.

TABLE 1

| Primer | SEQ ID NO | Sequence (5'→3') |
|---|---|---|
| Primer 1 | 5 | gggatccatacccaagatggcatgg |
| Primer 2 | 6 | gctggaggatttagatttggtgactcctcattgaca |
| Primer 3 | 7 | tgtcaatgaggagtcaccaaatctaaatcctccagc |
| Primer 4 | 8 | gggatcccttaaaaagcttttcgac |

TABLE 1-continued

| Primer | SEQ ID NO | Sequence (5'→3') |
|---|---|---|
| Primer 5 | 9 | Ggaagcttcttgacctgcatgatctcg |
| Primer 6 | 10 | gccaatcgagaacgcatgcccactactttacggtca |
| Primer 7 | 11 | atgaccgtaaagtagtgggcatgcgttctcgattggc |
| Primer 8 | 12 | ggaagctttacaccaaccacaactgc |

Example 2

Construction of Two Vectors Overexpressing glnA

Using the glnA gene DNA of ATCC13032 as a template, PCR was performed with a combination of primer 9 and primer 10 to obtain a glnA(AT) amplification product.

Separately, using the glnA gene DNA of KFCC10694 as a template, PCR was performed with a combination of primer 11 and primer 12 to obtain a glnA(KF) amplification product.

As a result of examining the homology between the glnA(AT) and the glnA(KF), it was confirmed that the nucleotide sequence homology was only 88.2% and the amino acid sequence homology was only 93.7%. The amino acid sequences and nucleotide sequences of glnA (AT) and glnA(KF) are shown in Table 2 below.

TABLE 2

| List | SEQ ID NO | Sequence information |
|---|---|---|
| KFCC10694 GS amino acid | 1 | vafntpeeivkfikdenvefvdvrftdvpgteqhfsipaalfdeeaieeglafdgssi rgfttidesdmnllpdlgtatidpfrkaktlnikffvhdpftreafsrdprnvarkae qylastgiadtcnfgaeaefylfdsvrystdinssfyhvdtnegwwnrgretnldgtp nlgaknrvkggyfpvapydqtveirddmvnylsnagfqlerfhhevgggqqeinyrfn tmlhaaddiqtfkyiikntahlhgktatfmpkplagdngsgmhahqslwkdgkplfhd esgyaglsdiaryyiggilhhagavlaftnptlnsyhrlvpgfeapinlvysqrnrsa avripitgsnpkakriefrapdpsgnpyfgfaammmagldgiknriephapvdkdlye lppeeaasipqaptsleaslkalqedsdflesdvftedliesyiqykydneitpvrl rptpqefemyfdc |
| KFCC10694 glnA nucleotide | 2 | gtggcgtttaatacccggaagaaatagtcaagttcatcaaagacgagaacgtcga attcgtagacgttcgcttcaccgatgtaccaggaactgaacagcacttcagcatcc cagccgccctcttcgatgaagaggccatcgaagaaggcctagcattcgacggatcc tcgatccgcggattcaccaccatcgatgagtctgacatgaacctcctaccagacct cggaactgccaccattgacccgttccgcaaggccaagactctgaacatcaagttct tcgttcatgatccattcacccgcgaagctttctcccgcgacccacgcaatgtggca cgcaaggcagagcagtacctcgcctccaccggcattgcagatacctgcaacttcgg cgcagaagccgagttctacctctttgattcagtccgctactccaccgatattaact ccagcttctaccacgttgataccaatgaaggctggtggaaccgtggccgggaaacc aaccttgatggcaccccaaaccttggcgccaagaaccgtgtcaagggcggatactt ccctgttgcaccatatgaccaaaccgtggaaatccgcgatgatatgtcaactacc tctcaaacgctggtttccaacttgagcgtttccaccacgaggtcggcggtggacag caggagatcaactaccgcttcaacaccatgctgcacgcggctgatgatattcagac attcaagtacatcatcaagaacaccgctcacctccacggcaagaccgcaacctta tgcctaagccactggctggcgacaacggctctggaatgcacgcacaccagtcccta tggaaggacggcaagccactcttccacgatgagtccggttacgcaggcctatctga catcgcccgctactacattggtggcatcctgcaccacgcaggtgcagtattggcgt tcaccaacccaaccctgaactcctaccaccgtttagttcctggcttcgaggcgcca atcaacttggtgtactcccagcgcaaccgctctgctgctgtacgtatcccaatcac cggatccaacccaaaggcaaagcgcatcgagttccgcgctccggacccatcaggca acccatacttcggcttcgctgccatgatgatggctggccttgacggcatcaagaac cgcatcgagccacacgcaccagtggataaggatctctacgagcttccaccagagga agctgcctccatcccacaggctccaacctcccttgaagcttcattgaaggctcttc aggaagattccgacttcctcaccgagtctgatgtcttcaccgaagatctcatcgag tcctacatccagtacaagtacgacaacgagatcacccccagtccgtttgcgcccaac tcctcaagagttcgaaatgtacttcgactgctaa |

TABLE 2-continued

| List | SEQ ID NO | Sequence information |
|---|---|---|
| ATCC13032 GS amino acid | 3 | vafetpeeivkfikdenvefvdvrftdlpgteqhfsipaasfdadtieeglafdgssi rgftttidesdmnllpdlgtatldpfrkaktlnvkffvhdpftreafsrdprnvarkae qylastgiadtcnfgaeaefylfdsvrystemnsgfyevdteegwwnrgketnldgtp nlgaknrvkggyfpvapydqtvdvrddmvrnlaasgfalerfhhevgggqqeinyrfn tmlhaaddiqtfkyiikntarlhgkaatfmpkplagdngsgmhahqslwkdgkplfhd esgyagisdiaryyiggilhhagavlaftnatinsyhrivpgfeapinlvysqrnrsa avripitgsnpkakriefrapdpsgnpylgfaammmagldgiknriephapvdkdlye lppeeaasipqaptsleaslkalqedtdfltesdvftedlieayiqykydneispvrl rptpqefelyfdc |
| ATCC13032 glnA nucleotide | 4 | gtggcgtttgaaacccggaagaaattgtcaagttcatcaaggatgaaaacgtcga gttcgttgacgttcgattcaccgaccttcccggcaccgagcagcacttcagcatcc cagctgccagcttcgatgcagatacaatcgaagaaggtctcgcattcgacggatcc tcgatccgtggcttcaccacgatcgacgaatctgacatgaatctcctgccagacct cggaacggccacccttgatccattccgcaaggcaaagaccctgaacgttaagttct tcgttcacgatcctttcacccgcgaggcattctcccgcgacccacgcaacgtggca cgcaaggcagagcagtacctggcatccaccggcattgcagacacctgcaacttcgg cgccgaggctgagttctacctcttcgactccgttcgctactccaccgagatgaact ccggcttctacgaagtagataccgaagaaggctggtggaaccgtggcaaggaaacc aacctcgacggcaccccaaacctgggcgcaaagaaccgcgtcaagggtggctactt cccagtagcaccatacgaccaaaccgttgacgtgcgcgatgacatggttcgcaacc tcgcagcttccggcttcgctcttgagcgtttccaccacgaagtcggtggcggacag caggaaatcaactaccgcttcaacaccatgctccacgcggcagatgatatccagac cttcaagtacatcatcaagaacaccgctcgcctccacggcaaggctgcaaccttca tgcctaagccactggctggcgacaacggttccggcatgcacgctcaccagtccctc tggaaggacggcaagccactcttccacgatgagtccggctacgcaggcctgtccga catcgcccgctactacatcggcggcatcctgcaccacgcaggcgctgttctggcgt tcaccaacgcaaccctgaactcctaccaccgtctggttccaggcttcgaggctcca atcaacctggtgtactcacagcgcaaccgttccgctgctgtccgtatcccaatcac cggatccaacccgaaggcaaagcgcatcgaattccgcgctccagacccatcaggca acccatacctgggctttgcagcgatgatgatggccggcctcgacggcatcaagaac cgcatcgagccacacgctccagtggacaaggacctctacgaactaccaccagagga agctgcatccattccacaggcaccaacctccctggaagcatccctgaaggcactgc aggaagacaccgacttcctcaccgagtctgacgtcttcaccgaggatctcatcgag gcgtacatccagtacaagtacgacaacgagatctccccagttcgcctgcgcccaac cccgcaggaattcgaattgtacttcgactgctaa |

As sod promoters, a first sod promoter amplification product was obtained by amplifying the chromosomal DNA of ATCC13032 as a template using a combination of primer 13 (forward) and primer 14 (backward), and a second sod promoter amplification product was obtained by amplifying the chromosomal DNA of ATCC13032 as a template using a combination of primer 13 (forward) and primer 15 (backward). The reason why primers 14 and 15 were used separately as the reverse primers (backward) is because of the difference in the glnA sequence, and the sod promoter sequences are the same (see gggtaaaaaatcctttcg in Table 3 below).

As rrnBT1T2 transcription terminator sequences, a first rrnBT1T2 amplification product was obtained by amplifying the chromosomal DNA of E. coli DH5a as a template using a combination of primer 16 (forward) and primer 17 (backward), and a second 2 rrnBT1T2 amplification product was obtained by amplifying the chromosomal DNA of E. coli DH5a using a combination of primer 18 (backward) and primer 17 (backward). The reason why primers 16 and 18 were used separately as the forward primers is because of the difference in the glnA sequence, and the transcription terminator sequences are the same (see agaatttgcctggcggca in Table 3 below).

Figure 4:
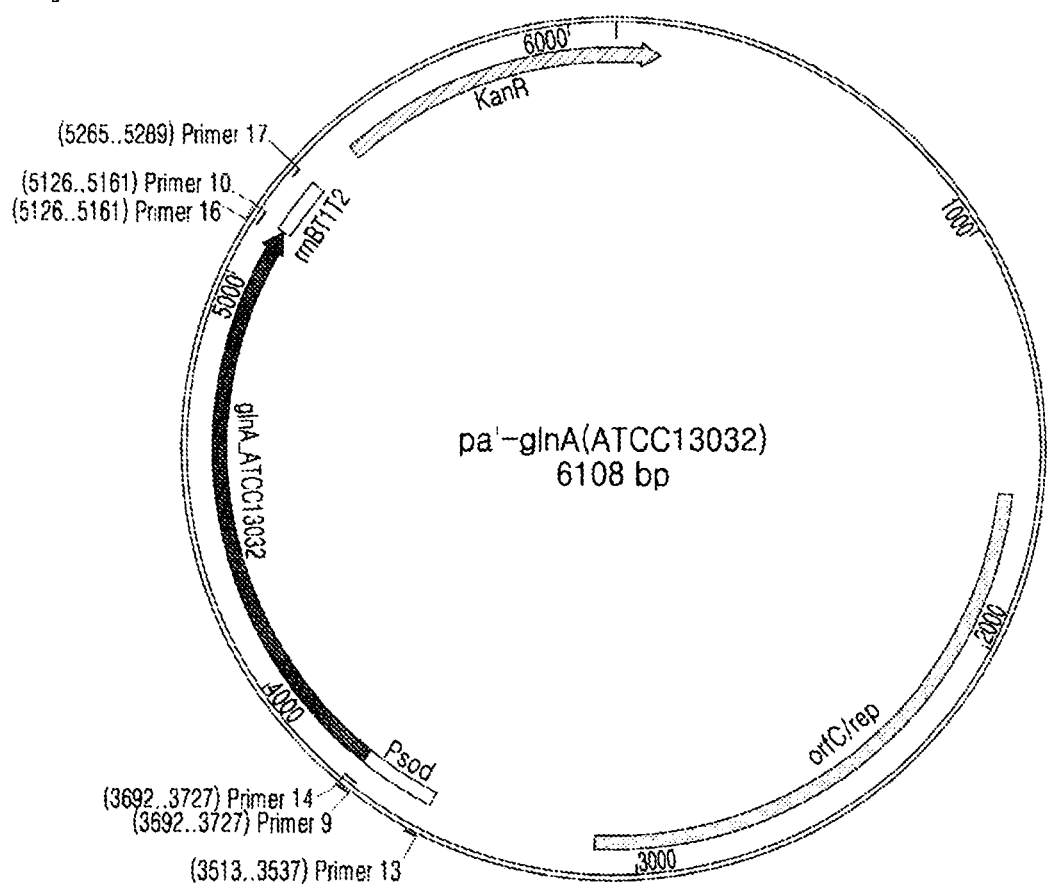
FIG. 4 shows a pa'-glnA(ATCC13032) vector according to one embodiment.

The first sod promoter amplification product, glnA(AT), and the first rrnBT1T2 terminator amplification product were inserted into the BamHI site in a pa' vector, which is an E. coli-Corynebacterium shuttle vector, by performing crossover PCR using a combination of primer 13 and primer 17, thereby constructing a pa'-glnA(AT) vector (see FIG. 4).

Figure 5:
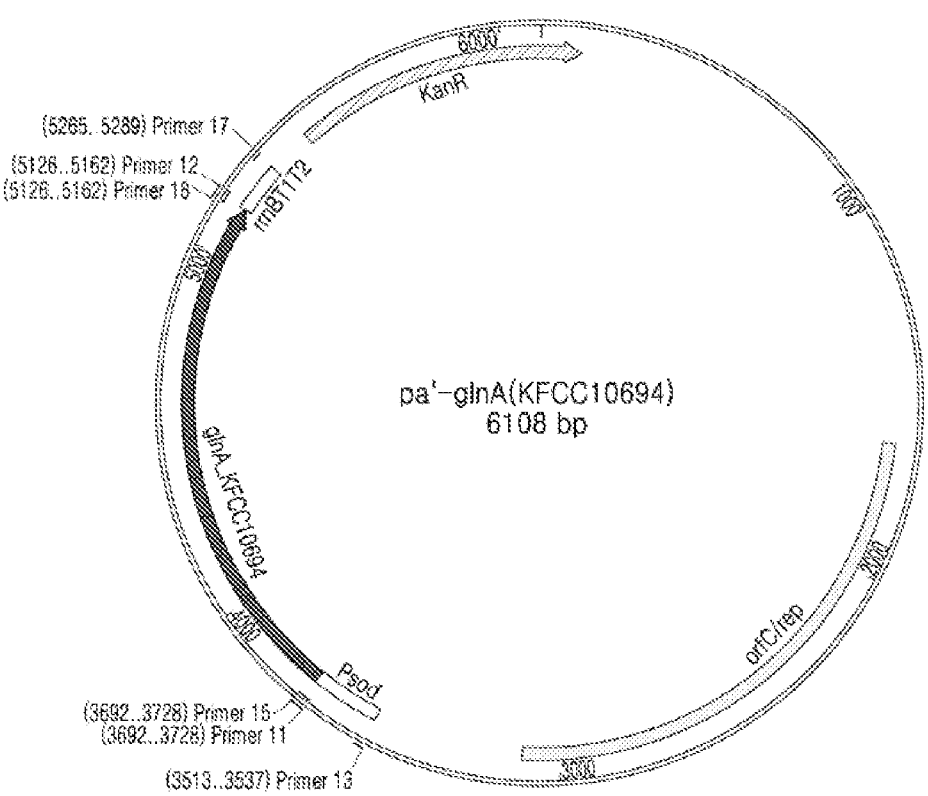
FIG. 5 shows a pa'-glnA(KFCC10694) vector according to one embodiment.

Similarly, the second sod promoter amplification product, glnA(KF), and the second rrnBT1T2 terminator amplification product were inserted into the BamHI site in a pa' vector, which is an E. coli-Corynebacterium shuttle vector, by performing crossover PCR using a combination of primer 13 and primer 17, thereby constructing a pa'-glnA(KF) vector (see FIG. 5).

Experimental materials used in Example 2 were Prime-STAR Max DNA Polymerase (Takara, Japan), DNA ligation kit (Takara, Japan), and BamHI (NEB, England).

The nucleotide sequences of primers 9 to 18 are shown in Table 3 below.

TABLE 3

| Primer | SEQ ID NO | Sequence (5'→3') |
|---|---|---|
| Primer 9 | 13 | cgaaaggattttttaccgtggcgtttgaaaccccg |
| Primer 10 | 14 | tgccgccaggcaaattctttagcagtcgaagtacaa |
| Primer 11 | 15 | cgaaaggattttttaccgtggcgtttaataccccgg |
| Primer 12 | 16 | ctgccgccaggcaaattctttagcagtcgaagtacat |
| Primer 13 | 17 | Gggatccagctgccaattattccggg |
| Primer 14 | 18 | cggggtttcaaacgccacgggtaaaaaatcctttcg |
| Primer 15 | 19 | ccggggtattaaacgccacgggtaaaaaatcctttcg |
| Primer 16 | 20 | ttgtacttcgactgctaaagaatttgcctggcggca |

TABLE 3-continued

| Primer | SEQ ID NO | Sequence (5'→3') |
|---|---|---|
| Primer 17 | 21 | gggatccttcgtttatttgatgcc |
| Primer 18 | 22 | atgtacttcgactgctaaagaatttgcctggcggcag |

Example 3

Construction of KFCC10694 Strain Containing Deletion of glnA Gene and/or glnE Gene The pK19ms/ΔglnA vector constructed in Example 1 was introduced by electroporation into competent cells of the KFCC10694 strain, and the cells were plated on 2YT KM AGAR medium, and then cultured in an incubator at 30° C. for 4 days to obtain colonies. Among the colonies in which the first homologous recombination was induced, the transformed colonies were cultured in 2YT liquid medium for 12 hours, and then plated on 2YT sucrose GM agar medium, and the antibiotic marker was removed by the second homologous recombination. Whether the glnA gene was removed as intended was finally checked by subjecting the selected colony to PCR and sequencing. The glnA gene-deleted strain constructed through the above-described process was named D10694A.

In the same manner, the pK19ms/ΔglnE vector constructed in Example 1 was introduced into the D10694A strain, thereby constructing a strain containing deletion of both glnA and glnE genes. The medium used in this experiment contained glutamine at a concentration of 100 mg/L. The strain containing deletion of both glnA and glnE genes, constructed through the above-described process, was named D10694AE.

Experimental materials used in Example 3 were 2YT agar (16 g/L tryptone, 10 g/L yeast extract, 5 g/L NaCl, 1.5% agar), 2YT KM agar (2YT agar, 15 mg/L kanamycine), 2YT sucrose GM agar (2YT agar, 100 g/L sucrose, 100 mg/L glutamine), and electrophorator (BIO-RAD, USA).

Example 4

Construction of Strain into which pa'-glnA(AT) Vector or pa'-glnA(KF) Vector has been Introduced Each of the pa'-glnA(ATCC13032) vector and pa'-glnA (KFCC10694) vector constructed in Example 2 was introduced by electroporation into each of the D10694A and D10694AE strains constructed in Example 3. Each of the strains into which each of the vectors has been introduced was plated on 2YT KM AGAR medium and cultured for 3 days in an incubator at 30° C. to obtain colonies. The strains constructed through the above-described process were named D10694A/pa-glnA(AT), D10694A/pa-glnA(KF), D10694AE/pa-glnA(AT), and D10694AE/pa-glnA(KF), respectively.

Experimental materials used in Example 4 were 2YT agar (16 g/L tryptone, 10 g/L yeast extract, 5 g/L NaCl, 1.5% agar), 2YT KM agar (2YT agar, 15 mg/L kanamycine), and electrophorator (BIO-RAD, USA).

Example 5

Analysis of Glutamine Productivities of Strains Constructed in Example 4

20 ml of seed medium was dispensed into 500-ml Erlenmeyer flasks and autoclaved according to a conventional method, and then each of the strains was inoculated into the medium and cultured with shaking at 30° C. for 24 hours to obtain seed cultures. 100 ml of production medium was dispensed into 500-ml Erlenmeyer flasks and autoclaved according to a conventional method, and then 100 ml of each of the previously prepared seed cultures was inoculated into the medium and cultured with shaking at 30° C. for 72 hours. For comparison of productivity with the D10694A and D10694AE strains, 100 mg/L of glutamine was added to the medium. After completion of the culturing, determination of the L-glutamine content in each of the cultures was performed by a conventional HPLC method.

The experimental results for glutamine productivity are shown in Table 4 below.

TABLE 4

| Strain name | OD(1/100) | Δ(L-GLN(%)) |
|---|---|---|
| KFCC10694 | 0.256 | 3.56 |
| D10694A (glnA-deleted) | 0.135 | n.d. |
| D10694AE (glnA- and glnE-deleted) | 0.185 | n.d. |
| D10694A/Pa-glnA(AT) | 0.138 | 1.97 |
| D10694A/Pa-glnA(KF) | 0.202 | 5.24 |
| D10694AE/Pa-glnA(AT) | 0.209 | 3.88 |
| D10694AE/Pa-glnA(KF) | 0.217 | 5.31 |

The experimental results in Table 4 above showed that the D10694A strain and D10694AE strain did not produce L-glutamine due to deletion of glnA (GS expression gene).

Regarding the glutamine productivities of D10694A/Pa-glnA (AT) and D10694A/Pa-glnA (KF) in Table 4, the L-glutamine productivity of D10694A/Pa-glnA (AT) decreased compared to that of the parent strain KFCC10694, whereas the L-glutamine productivity of D10694A/Pa-glnA (KF) increased compared to that of the parent strain KFCC10694. Although the same sod promoter was introduced into the two strains, the L-glutamine productivity was significantly higher when glnA (KF) was introduced than when glnA (AT) was introduced. This suggests that there is a difference in the extent of feedback inhibition between glnA (AT) and glnA (KF).

As a result of examining the L-glutamine productivities of D10694AE/Pa-glnA(AT) and D10694AE/Pa-glnA(KF) that do not undergo feedback inhibition due to ATase inactivation, it could be seen that the L-glutamine productivity of the D10694AE/Pa-glnA(AT) strain was about 1.91% higher than that of the D10694A/Pa-glnA(AT) strain, indicating that there was a significant difference in L-glutamine productivity depending on the presence or absence of ATase activity. However, it could be seen that the L-glutamine productivity of the D10694AE/Pa-glnA(KF) strain increased by 0.07% compared to that of the D10694A/Pa-glnA(KF) strain, but the extent of the increase was not significant, indicating that the difference in L-glutamine productivity depending on the presence or absence of ATase activity was not significant. This means that glnA(KF) is less feedback-inhibited by ATase.

More specifically, the D10694A/Pa-glnA(KF) strain showed an increase in productivity of about 47% compared to the parent strain, and the D10694AE/Pa-glnA(KF) strain showed an increase in productivity of about 49% compared to the parent strain. What is noteworthy here is that the productivity difference between D10694A/Pa-glnA(KF) and D10694AE/Pa-glnA(KF) compared to the parent strain was only 2%, which was insignificant. Although D10694AE/Pa-glnA(KF) additionally lacked the glnE gene involved in the feedback inhibition of GS, the increase in glutamine productivity of D10694AE/Pa-glnA(KF) from that of the parent strain was only 2% compared to the increase in glutamine productivity of D10694A/Pa-glnA(KF) from that of the parent strain, indicating that the difference in glutamine productivity depending on the presence or absence of ATase activity was not significant. This suggests that the increase in productivity by introduction of glnA(KF) was not simply due to contribution of the sod promoter, but was due to contribution of the resistance of glnA(KF) to feedback inhibition.

The invention claimed is:

1. A vector for transformation containing a nucleotide sequence encoding a glutamine synthetase consisting of the amino acid sequence of SEQ ID NO: 1.

2. The vector of claim 1, wherein the nucleotide sequence encoding the glutamine synthetase consists of SEQ ID NO: 2.

3. The vector of claim 1, containing a promoter operably linked to the nucleotide sequence encoding the glutamine synthetase.

4. The vector of claim 1, containing a transcription terminator sequence operably linked to the nucleotide sequence encoding the glutamine synthetase.

5. A strain transformed with the vector for transformation according to claim 1.

6. The strain of claim 5, wherein expression of a native glnE gene in the strain has been inactivated.

7. The strain of claim 5, which is *Corynebacterium glutamicum*.

8. A method for producing glutamine comprising a step of culturing the strain of claim 5.

\* \* \* \* \*

SEQUENCE LISTING

```
<160> NUMBER OF SEQ ID NOS: 22

<210> SEQ ID NO 1
<211> LENGTH: 477
<212> TYPE: PRT
<213> ORGANISM: Artificial Sequence
<220> FEATURE:
<223> OTHER INFORMATION: KFCC10694 GS

<400> SEQUENCE: 1

Val Ala Phe Asn Thr Pro Glu Glu Ile Val Lys Phe Ile Lys Asp Glu
1               5                   10                  15

Asn Val Glu Phe Val Asp Val Arg Phe Thr Asp Val Pro Gly Thr Glu
            20                  25                  30

Gln His Phe Ser Ile Pro Ala Ala Leu Phe Asp Glu Glu Ala Ile Glu
        35                  40                  45

Glu Gly Leu Ala Phe Asp Gly Ser Ser Ile Arg Gly Phe Thr Thr Ile
    50                  55                  60

Asp Glu Ser Asp Met Asn Leu Leu Pro Asp Leu Gly Thr Ala Thr Ile
65                  70                  75                  80

Asp Pro Phe Arg Lys Ala Lys Thr Leu Asn Ile Lys Phe Phe Val His
                85                  90                  95

Asp Pro Phe Thr Arg Glu Ala Phe Ser Arg Asp Pro Arg Asn Val Ala
            100                 105                 110

Arg Lys Ala Glu Gln Tyr Leu Ala Ser Thr Gly Ile Ala Asp Thr Cys
        115                 120                 125

Asn Phe Gly Ala Glu Ala Glu Phe Tyr Leu Phe Asp Ser Val Arg Tyr
    130                 135                 140

Ser Thr Asp Ile Asn Ser Ser Phe Tyr His Val Asp Thr Asn Glu Gly
145                 150                 155                 160

Trp Trp Asn Arg Gly Arg Glu Thr Asn Leu Asp Gly Thr Pro Asn Leu
                165                 170                 175

Gly Ala Lys Asn Arg Val Lys Gly Gly Tyr Phe Pro Val Ala Pro Tyr
            180                 185                 190

Asp Gln Thr Val Glu Ile Arg Asp Asp Met Val Asn Tyr Leu Ser Asn
        195                 200                 205

Ala Gly Phe Gln Leu Glu Arg Phe His His Glu Val Gly Gly Gly Gln
    210                 215                 220

Gln Glu Ile Asn Tyr Arg Phe Asn Thr Met Leu His Ala Ala Asp Asp
225                 230                 235                 240

Ile Gln Thr Phe Lys Tyr Ile Ile Lys Asn Thr Ala His Leu His Gly
                245                 250                 255

Lys Thr Ala Thr Phe Met Pro Lys Pro Leu Ala Gly Asp Asn Gly Ser
            260                 265                 270

Gly Met His Ala His Gln Ser Leu Trp Lys Asp Gly Lys Pro Leu Phe
        275                 280                 285

His Asp Glu Ser Gly Tyr Ala Gly Leu Ser Asp Ile Ala Arg Tyr Tyr
```

```
             290                 295                 300
Ile Gly Gly Ile Leu His His Ala Gly Ala Val Leu Ala Phe Thr Asn
305                 310                 315                 320

Pro Thr Leu Asn Ser Tyr His Arg Leu Val Pro Gly Phe Glu Ala Pro
                325                 330                 335

Ile Asn Leu Val Tyr Ser Gln Arg Asn Arg Ser Ala Ala Val Arg Ile
                340                 345                 350

Pro Ile Thr Gly Ser Asn Pro Lys Ala Lys Arg Ile Glu Phe Arg Ala
            355                 360                 365

Pro Asp Pro Ser Gly Asn Pro Tyr Phe Gly Phe Ala Ala Met Met Met
370                 375                 380

Ala Gly Leu Asp Gly Ile Lys Asn Arg Ile Glu Pro His Ala Pro Val
385                 390                 395                 400

Asp Lys Asp Leu Tyr Glu Leu Pro Pro Glu Ala Ala Ser Ile Pro
                405                 410                 415

Gln Ala Pro Thr Ser Leu Glu Ala Ser Leu Lys Ala Leu Gln Glu Asp
                420                 425                 430

Ser Asp Phe Leu Thr Glu Ser Asp Val Phe Thr Glu Asp Leu Ile Glu
            435                 440                 445

Ser Tyr Ile Gln Tyr Lys Tyr Asp Asn Glu Ile Thr Pro Val Arg Leu
            450                 455                 460

Arg Pro Thr Pro Gln Glu Phe Glu Met Tyr Phe Asp Cys
465                 470                 475

<210> SEQ ID NO 2
<211> LENGTH: 1434
<212> TYPE: DNA
<213> ORGANISM: Artificial Sequence
<220> FEATURE:
<223> OTHER INFORMATION: KFCC10694 glnA

<400> SEQUENCE: 2
gtggcgttta ataccccgga agaaatagtc aagttcatca aagacgagaa cgtcgaattc     60
gtagacgttc gcttcaccga tgtaccagga actgaacagc acttcagcat cccagccgcc    120
ctcttcgatg aagaggccat cgaagaaggc ctagcattcg acggatcctc gatccgcgga    180
ttcaccacca tcgatgagtc tgacatgaac ctcctaccag acctcggaac tgccaccatt    240
gacccgttcc gcaaggccaa gactctgaac atcaagttct tcgttcatga tccattcacc    300
cgcgaagctt tctcccgcga cccacgcaat gtggcacgca aggcagagca gtacctcgcc    360
tccaccggca ttgcagatac ctgcaacttc ggcgcagaag ccgagttcta cctctttgat    420
tcagtccgct actccaccga tattaactcc agcttctacc acgttgatac caatgaaggc    480
tggtggaacc gtggccggga accaaccttg atggcaccc caaaccttgg cgccaagaac    540
cgtgtcaagg gcggatactt ccctgttgca ccatatgacc aaaccgtgga atccgcgat    600 gatatggtca actacctctc aaacgctggt ttccaacttg agcgtttcca ccacgaggtc    660
ggcggtggac agcaggagat caactaccgc ttcaacacca tgctgcacgc ggctgatgat    720
attcagacat tcaagtacat catcaagaac accgctcacc tccacggcaa gaccgcaacc    780
tttatgccta agccactggc tggcgacaac ggctctggaa tgcacgcaca ccagtcccta    840
tggaaggacg gcaagccact cttccacgat gagtccggtt acgcaggcct atctgacatc    900
gcccgctact acattggtgg catcctgcac acgcaggtg cagtattggc gttcaccaac    960
ccaaccctga actcctacca ccgtttagtt cctggcttcg aggcgccaat caacttggtg   1020
```

-continued

```
tactcccagc gcaaccgctc tgctgctgta cgtatcccaa tcaccggatc caacccaaag    1080
gcaaagcgca tcgagttccg cgctccggac ccatcaggca acccatactt cggcttcgct    1140
gccatgatga tggctggcct tgacggcatc aagaaccgca tcgagccaca cgcaccagtg    1200
gataaggatc tctacgagct tccaccagag gaagctgcct ccatcccaca ggctccaacc    1260
tcccttgaag cttcattgaa ggctcttcag gaagattccg acttcctcac cgagtctgat    1320
gtcttcaccg aagatctcat cgagtcctac atccagtaca gtacgacaa cgagatcacc    1380 ccagtccgtt tgcgcccaac tcctcaagag ttcgaaatgt acttcgactg ctaa          1434
```

<210> SEQ ID NO 3
<211> LENGTH: 477
<212> TYPE: PRT
<213> ORGANISM: Artificial Sequence
<220> FEATURE:
<223> OTHER INFORMATION: ATCC13032 GS

<400> SEQUENCE: 3

```
Val Ala Phe Glu Thr Pro Glu Glu Ile Val Lys Phe Ile Lys Asp Glu
1               5                  10                  15

Asn Val Glu Phe Val Asp Val Arg Phe Thr Asp Leu Pro Gly Thr Glu
            20                  25                  30

Gln His Phe Ser Ile Pro Ala Ala Ser Phe Asp Ala Asp Thr Ile Glu
        35                  40                  45

Glu Gly Leu Ala Phe Asp Gly Ser Ser Ile Arg Gly Phe Thr Thr Ile
    50                  55                  60

Asp Glu Ser Asp Met Asn Leu Leu Pro Asp Leu Gly Thr Ala Thr Leu
65                  70                  75                  80

Asp Pro Phe Arg Lys Ala Lys Thr Leu Asn Val Lys Phe Phe Val His
                85                  90                  95

Asp Pro Phe Thr Arg Glu Ala Phe Ser Arg Asp Pro Arg Asn Val Ala
            100                 105                 110

Arg Lys Ala Glu Gln Tyr Leu Ala Ser Thr Gly Ile Ala Asp Thr Cys
        115                 120                 125

Asn Phe Gly Ala Glu Ala Glu Phe Tyr Leu Phe Asp Ser Val Arg Tyr
    130                 135                 140

Ser Thr Glu Met Asn Ser Gly Phe Tyr Glu Val Asp Thr Glu Glu Gly
145                 150                 155                 160

Trp Trp Asn Arg Gly Lys Glu Thr Asn Leu Asp Gly Thr Pro Asn Leu
                165                 170                 175

Gly Ala Lys Asn Arg Val Lys Gly Gly Tyr Phe Pro Val Ala Pro Tyr
            180                 185                 190

Asp Gln Thr Val Asp Val Arg Asp Met Val Arg Asn Leu Ala Ala
        195                 200                 205

Ser Gly Phe Ala Leu Glu Arg Phe His His Glu Val Gly Gly Gly Gln
    210                 215                 220

Gln Glu Ile Asn Tyr Arg Phe Asn Thr Met Leu His Ala Ala Asp Asp
225                 230                 235                 240

Ile Gln Thr Phe Lys Tyr Ile Ile Lys Asn Thr Ala Arg Leu His Gly
                245                 250                 255

Lys Ala Ala Thr Phe Met Pro Lys Pro Leu Ala Gly Asp Asn Gly Ser
            260                 265                 270

Gly Met His Ala His Gln Ser Leu Trp Lys Asp Gly Lys Pro Leu Phe
        275                 280                 285

His Asp Glu Ser Gly Tyr Ala Gly Leu Ser Asp Ile Ala Arg Tyr Tyr
```

```
                290                 295                 300
Ile Gly Gly Ile Leu His His Ala Gly Ala Val Leu Ala Phe Thr Asn
305                 310                 315                 320

Ala Thr Leu Asn Ser Tyr His Arg Leu Val Pro Gly Phe Glu Ala Pro
                325                 330                 335

Ile Asn Leu Val Tyr Ser Gln Arg Asn Arg Ser Ala Ala Val Arg Ile
                340                 345                 350

Pro Ile Thr Gly Ser Asn Pro Lys Ala Lys Arg Ile Glu Phe Arg Ala
            355                 360                 365

Pro Asp Pro Ser Gly Asn Pro Tyr Leu Gly Phe Ala Ala Met Met Met
        370                 375                 380

Ala Gly Leu Asp Gly Ile Lys Asn Arg Ile Glu Pro His Ala Pro Val
385                 390                 395                 400

Asp Lys Asp Leu Tyr Glu Leu Pro Pro Glu Ala Ala Ser Ile Pro
                405                 410                 415

Gln Ala Pro Thr Ser Leu Glu Ala Ser Leu Lys Ala Leu Gln Glu Asp
                420                 425                 430

Thr Asp Phe Leu Thr Glu Ser Asp Val Phe Thr Glu Asp Leu Ile Glu
            435                 440                 445

Ala Tyr Ile Gln Tyr Lys Tyr Asp Asn Glu Ile Ser Pro Val Arg Leu
        450                 455                 460

Arg Pro Thr Pro Gln Glu Phe Glu Leu Tyr Phe Asp Cys
465                 470                 475

<210> SEQ ID NO 4
<211> LENGTH: 1434
<212> TYPE: DNA
<213> ORGANISM: Artificial Sequence
<220> FEATURE:
<223> OTHER INFORMATION: ATCC13032 glnA

<400> SEQUENCE: 4
gtggcgtttg aaaccccgga agaaattgtc aagttcatca aggatgaaaa cgtcgagttc      60
gttgacgttc gattcaccga ccttcccggc accgagcagc acttcagcat cccagctgcc     120
agcttcgatg cagatacaat cgaagaaggt ctcgcattcg acggatcctc gatccgtggc     180
ttcaccacga tcgacgaatc tgacatgaat ctcctgccag acctcggaac ggccacccct     240
gatccattcc gcaaggcaaa gaccctgaac gttaagttct tcgttcacga tccttttcacc    300 cgcgaggcat tctcccgcga cccacgcaac gtggcacgca aggcagagca gtacctggca     360
tccaccggca ttgcagacac ctgcaacttc ggcgccgagg ctgagttcta cctcttcgac     420
tccgttcgct actccaccga tgaactccc ggcttctacg aagtagatac cgaagaaggc      480
tggtggaacc gtggcaagga aaccaacctc gacggcaccc caaacctggg cgcaaagaac     540
cgcgtcaagg gtggctactt cccagtagca ccatacgacc aaaccgttga cgtgcgcgat     600
gacatggttc gcaacctcgc agcttccggc ttcgctcttg agcgtttcca ccacgaagtc     660
ggtggcggac agcaggaaat caactaccgc ttcaacacca tgctccacgc ggcagatgat     720
atccagacct tcaagtacat catcaagaac accgctcgcc tccacggcaa ggctgcaacc     780
ttcatgccta agccactggc tggcgacaac ggttccggca tgcacgctca ccagtccctc     840
tggaaggacg gcaagccact cttccacgat gagtccggct acgcaggcct gtccgacatc     900
gcccgctact acatcggcgg catcctgcac acgcaggcg ctgttctggc gttcaccaac     960
gcaaccctga actcctacca ccgtctggtt ccaggcttcg aggctccaat caacctggtg    1020
```
tactcacagc gcaaccgttc cgctgctgtc cgtatcccaa tcaccggatc caacccgaag    1080
gcaaagcgca tcgaattccg cgctccagac ccatcaggca acccatacct gggctttgca    1140
gcgatgatga tggccggcct cgacggcatc aagaaccgca tcgagccaca cgctccagtg    1200
gacaaggacc tctacgaact accaccagag gaagctgcat ccattccaca ggcaccaacc    1260
tccctggaag catccctgaa ggcactgcag gaagacaccg acttcctcac cgagtctgac    1320
gtcttcaccg aggatctcat cgaggcgtac atccagtaca agtacgacaa cgagatctcc    1380
ccagttcgcc tgcgcccaac cccgcaggaa ttcgaattgt acttcgactg ctaa          1434

<210> SEQ ID NO 5
<211> LENGTH: 25
<212> TYPE: DNA
<213> ORGANISM: Artificial Sequence
<220> FEATURE:
<223> OTHER INFORMATION: primer 1

<400> SEQUENCE: 5
gggatccata cccaagatgg catgg                                           25

<210> SEQ ID NO 6
<211> LENGTH: 36
<212> TYPE: DNA
<213> ORGANISM: Artificial Sequence
<220> FEATURE:
<223> OTHER INFORMATION: primer 2

<400> SEQUENCE: 6
gctggaggat ttagatttgg tgactcctca ttgaca                               36

<210> SEQ ID NO 7
<211> LENGTH: 36
<212> TYPE: DNA
<213> ORGANISM: Artificial Sequence
<220> FEATURE:
<223> OTHER INFORMATION: primer 3

<400> SEQUENCE: 7
tgtcaatgag gagtcaccaa atctaaatcc tccagc                               36

<210> SEQ ID NO 8
<211> LENGTH: 25
<212> TYPE: DNA
<213> ORGANISM: Artificial Sequence
<220> FEATURE:
<223> OTHER INFORMATION: primer 4

<400> SEQUENCE: 8
gggatccctt aaaaagcttt tcgac                                           25

<210> SEQ ID NO 9
<211> LENGTH: 27
<212> TYPE: DNA
<213> ORGANISM: Artificial Sequence
<220> FEATURE:
<223> OTHER INFORMATION: primer 5

<400> SEQUENCE: 9
ggaagcttct tgacctgcat gatctcg                                         27

<210> SEQ ID NO 10
<211> LENGTH: 36
<212> TYPE: DNA
<213> ORGANISM: Artificial Sequence

```
<220> FEATURE:
<223> OTHER INFORMATION: primer 6

<400> SEQUENCE: 10
gccaatcgag aacgcatgcc cactacttta cggtca                              36

<210> SEQ ID NO 11
<211> LENGTH: 37
<212> TYPE: DNA
<213> ORGANISM: Artificial Sequence
<220> FEATURE:
<223> OTHER INFORMATION: primer 7

<400> SEQUENCE: 11
atgaccgtaa agtagtgggc atgcgttctc gattggc                             37

<210> SEQ ID NO 12
<211> LENGTH: 26
<212> TYPE: DNA
<213> ORGANISM: Artificial Sequence
<220> FEATURE:
<223> OTHER INFORMATION: primer 8

<400> SEQUENCE: 12
ggaagcttta caccaaccac aactgc                                         26

<210> SEQ ID NO 13
<211> LENGTH: 36
<212> TYPE: DNA
<213> ORGANISM: Artificial Sequence
<220> FEATURE:
<223> OTHER INFORMATION: primer 9

<400> SEQUENCE: 13
cgaaaggatt ttttacccgt ggcgtttgaa accccg                              36

<210> SEQ ID NO 14
<211> LENGTH: 36
<212> TYPE: DNA
<213> ORGANISM: Artificial Sequence
<220> FEATURE:
<223> OTHER INFORMATION: primer 10

<400> SEQUENCE: 14
tgccgccagg caaattcttt agcagtcgaa gtacaa                              36

<210> SEQ ID NO 15
<211> LENGTH: 37
<212> TYPE: DNA
<213> ORGANISM: Artificial Sequence
<220> FEATURE:
<223> OTHER INFORMATION: primer 11

<400> SEQUENCE: 15
cgaaaggatt ttttacccgt ggcgtttaat accccgg                             37

<210> SEQ ID NO 16
<211> LENGTH: 37
<212> TYPE: DNA
<213> ORGANISM: Artificial Sequence
<220> FEATURE:
<223> OTHER INFORMATION: primer 12

<400> SEQUENCE: 16
ctgccgccag gcaaattctt tagcagtcga agtacat                             37
```

```
<210> SEQ ID NO 17
<211> LENGTH: 26
<212> TYPE: DNA
<213> ORGANISM: Artificial Sequence
<220> FEATURE:
<223> OTHER INFORMATION: primer 13

<400> SEQUENCE: 17
gggatccagc tgccaattat tccggg                                        26

<210> SEQ ID NO 18
<211> LENGTH: 36
<212> TYPE: DNA
<213> ORGANISM: Artificial Sequence
<220> FEATURE:
<223> OTHER INFORMATION: primer 14

<400> SEQUENCE: 18
cggggtttca aacgccacgg gtaaaaaatc ctttcg                             36

<210> SEQ ID NO 19
<211> LENGTH: 37
<212> TYPE: DNA
<213> ORGANISM: Artificial Sequence
<220> FEATURE:
<223> OTHER INFORMATION: primer 15

<400> SEQUENCE: 19
ccggggtatt aaacgccacg ggtaaaaaat cctttcg                            37

<210> SEQ ID NO 20
<211> LENGTH: 36
<212> TYPE: DNA
<213> ORGANISM: Artificial Sequence
<220> FEATURE:
<223> OTHER INFORMATION: primer 16

<400> SEQUENCE: 20
ttgtacttcg actgctaaag aatttgcctg gcggca                             36

<210> SEQ ID NO 21
<211> LENGTH: 25
<212> TYPE: DNA
<213> ORGANISM: Artificial Sequence
<220> FEATURE:
<223> OTHER INFORMATION: primer 17

<400> SEQUENCE: 21
gggatccttc gttttatttg atgcc                                         25

<210> SEQ ID NO 22
<211> LENGTH: 37
<212> TYPE: DNA
<213> ORGANISM: Artificial Sequence
<220> FEATURE:
<223> OTHER INFORMATION: primer 18

<400> SEQUENCE: 22
atgtacttcg actgctaaag aatttgcctg gcggcag                            37
```